United States Patent [19]
Bottorff et al.

[11] Patent Number: 5,402,720
[45] Date of Patent: Apr. 4, 1995

[54] BOOSTER-MISSILE SELF-ALIGNING ADAPTER

[75] Inventors: Marion R. Bottorff, Newbury Park; Duane L. Aakre, Moorpark; Brian E. MacDonald, Simi Valley; Paul M. Burri, Ventura; Donald Deverich, Moorpark; William R. Blackhurst, Toluca Lake; David C. Coe, Simi Valley; Anthony J. McEwan, Malibu, all of Calif.

[73] Assignee: Northrop Corporation, Los Angeles, Calif.

[21] Appl. No.: 788,321

[22] Filed: Nov. 5, 1991

[51] Int. Cl.⁶ .............................................. F42B 15/10
[52] U.S. Cl. ............................... 102/378; 60/225; 60/255; 244/54; 244/172; 403/2; 403/259
[58] Field of Search ............... 102/374, 377, 378, 380, 102/202; 403/2, 259, 344; 60/225, 253, 255; 244/54, 122 AD, 172; 285/323, 324

[56] References Cited

U.S. PATENT DOCUMENTS

| | | | |
|---|---|---|---|
| 1,617,003 | 2/1927 | Zeller | 403/259 |
| 2,721,517 | 10/1955 | Workman | 102/377 |
| 2,779,283 | 1/1957 | Baughman | 244/54 |
| 2,809,584 | 10/1957 | Smith | 102/378 |
| 3,139,031 | 6/1964 | Schroter et al. | 102/378 |
| 3,168,270 | 2/1965 | Bligard et al. | 244/54 |
| 3,185,090 | 5/1965 | Weber | 60/225 X |
| 3,438,303 | 4/1969 | Pesarini et al. | 102/377 |
| 3,855,789 | 12/1974 | Platzek | 60/225 |
| 4,137,848 | 2/1979 | Cunha | 102/378 |
| 4,348,957 | 9/1982 | White et al. | 102/378 |
| 4,925,369 | 5/1990 | Steiner et al. | 403/259 |

FOREIGN PATENT DOCUMENTS 216936  8/1961  Austria ................. 102/380

Primary Examiner—Harold J. Tudor
Attorney, Agent, or Firm—Terry J. Anderson; Robert B. Block; Karl J. Hoch, Jr.

[57] ABSTRACT

A self-aligning adapter used for attaching a booster to a missile includes a hollow tapered receptacle positioned on the missile. A tapered member sized and shaped to fit into and mate with the receptacle is positioned on the booster. The tapered member fits into the tapered receptacle to align and attach the booster to the missile. A linear explosive charge is positioned on the booster around where the tapered member is joined to the booster. Explosion of the charge severs the tapered member from the booster releasing the booster from the missile.

8 Claims, 2 Drawing Sheets

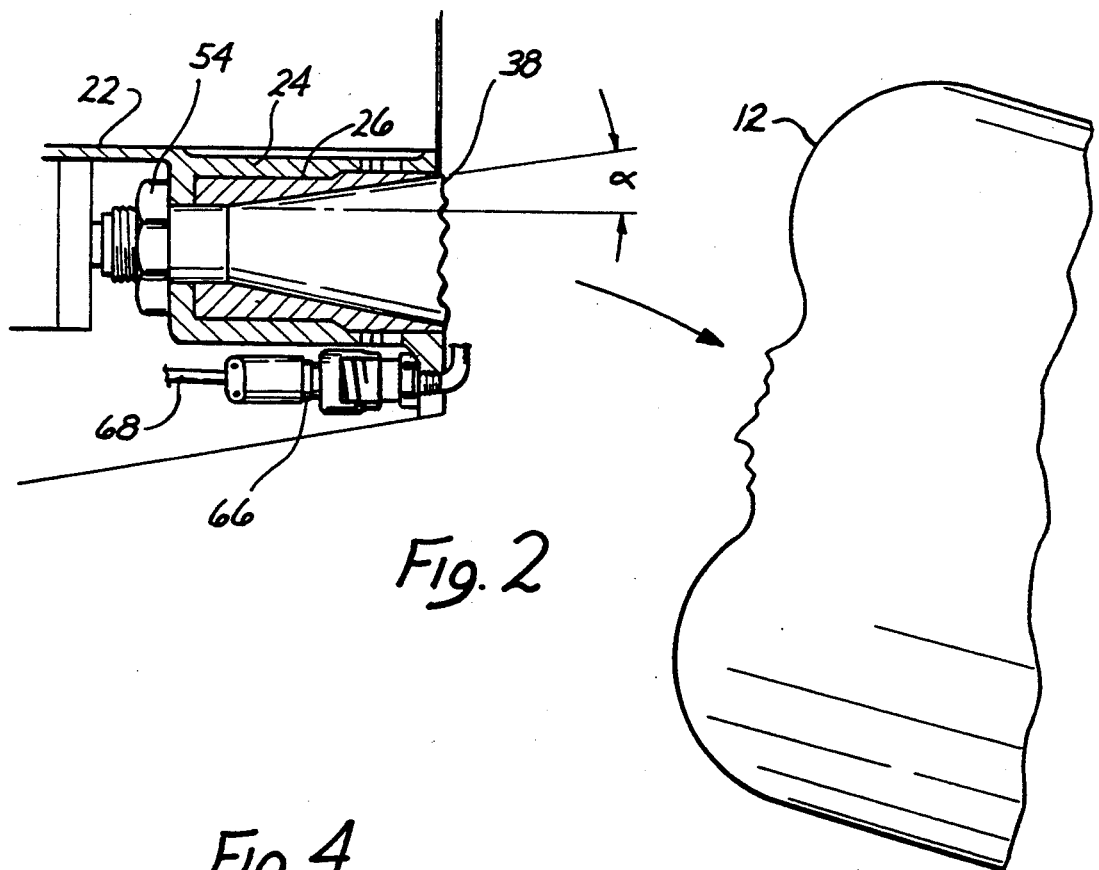
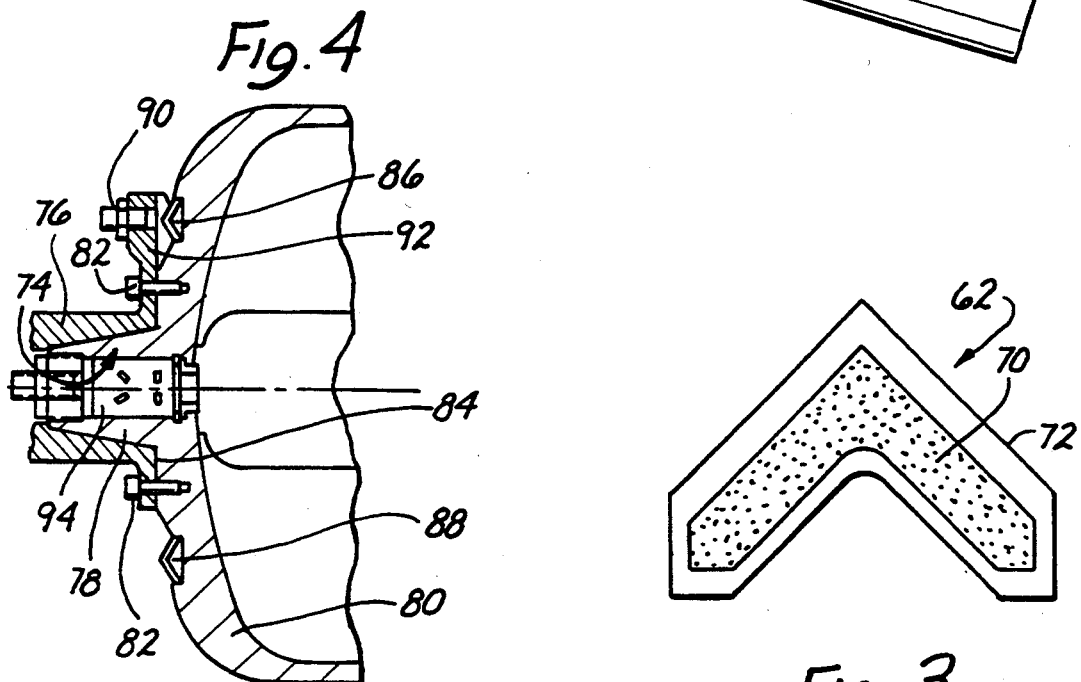

BOOSTER-MISSILE SELF-ALIGNING ADAPTER

BACKGROUND OF THE INVENTION

This invention is directed to an adapter for joining a booster to a missile. The adapter serves to self-align the booster to the missile such that the thrust vector of the booster is properly aligned in relation to the center of gravity of the missile.

Certain missile systems as, for instance, cruise missiles utilize turbojets, ramjets or other similar motors for propulsion. In order for a turbojet, a ramjet or the like to propel the missile, the missile must first be accelerated to flight speed. Normally booster rockets are utilized to accelerate surface launched missiles to flight speed. Once the fuel of the booster rocket is expended, the booster casing serves no further function. Its presence destablizes the missile, increases the weight of the missile system and increases drag. By jettisoning the booster rocket the weight of the expended booster rocket casing need not be carried by the missile, the aerodynamic drag of the booster rocket need not be experienced by the missile and the missile can have its normal stability.

To accelerate the missile to flight speed, it is important to apply the thrust of a booster rocket to the missile in such a way to assure proper pointing of the missile and transfer of maximum thrust from the booster to the missile. U.S. Pat. No. 3,855,789 describes a motor that serves both as a rocket motor and a ramjet motor. In this patent expendable baffles throttle the throat of a ramjet motor down to a smaller size allowing the throttled ramjet motor to be used as a rocket motor. Upon the expenditure of the rocket motor fuel supply carried within the ramjet motor casing, the throttling baffles are jettisoned and the motor is then operated in a ramjet mode. While this arrangement certainly is utilitarian, the fuel charge for the rocket motor, since it must be carried within the ramjet motor housing, is restricted to only the volume of the ramjet motor housing.

In order to provide for an independent booster rocket, an attachment mechanism must be utilized between the booster rocket and the missile that allows for correct alignment of the thrust vector of the booster rocket with the missile. Theoretically this can be achieved in one of two ways. The first way is to provide for an adjustable adapter that allows for adjustments of the booster to align it with the missile. Concurrently with this, necessary measuring devices or dedicated tooling must be provided for assessing when the correct alignment is achieved. A second method and easier method would be to provide an adapter that is self-adjusting or is inherently self-aligning. Such an adapter would inherently be more desirable than an adjustable adapter since it avoids the necessity of fabricating special tooling and aligning equipment and avoids any labor necessary in achieving alignment of the booster rocket with the missile.

Once the fuel supply of an external booster rocket has been spent, in order to have the correct missile stability, reduce the weight of the missile and eliminate any drag caused by the booster rocket it is desirable to jettison the booster rocket. The more complicated the structure that is utilized to attach the booster rocket to the missile the more complicated ejection or jettison of the booster rocket can become. Further, in ejecting a spent booster rocket it is also desirable not to impart any momentum to the missile that would tend to deviate the missile from its line of flight.

In order to achieve better ballistic flight characteristics U.S. Pat. No. 4,348,957 describes a method of jettisoning the nozzle exit cone of a rocket motor after burnout. In this patent a linear shaped charge positioned around the throat of a rocket nozzle is exploded to sever the rocket nozzle about its throat. This results in a boat tail configuration at the aft end of the missile after jettisoning of the rocket nozzle exit cone. As utilized in U.S. Pat. No. 4,348,957 the linear shaped explosive charge is used to redefine the shape of the aft end of a missile after booster burnout.

BRIEF DESCRIPTION OF THE INVENTION

It is a broad object of this invention to provide an adapter for connecting a booster rocket to a missile that allows for easy and exact self-alignment of the rocket motor to the body of the missile to assure proper pointing of the launch force. It is a further object to provide an adapter that is sufficiently robust to withstand transportation and handling loads yet is simple in use, self-aligning and allows for clean separation of an expended booster rocket from a missile following the launch phase of the missile.

In accordance with these and other objects as will become evident from the remainder of this specification, a booster-missile adapter is provided that includes a hollow tapered receptacle means for receiving a tapered member. The receptacle means is located on a missile in a position for receiving a booster. Further, a tapered member sized and shaped to fit into and mate with the tapered receptacle means is located on a booster, preferable at the fore end of the booster. A retaining means is provided for holding the tapered member in the receptacle means and an explosive release means is provided for explosively releasing the tapered member from the booster. In preferred embodiments of the invention the tapered member is shaped as a conical surface tapering from a broad aft end to a narrower truncated fore end and the tapered receptacle means is formed as a hollow conical shaped receptacle tapering from a broad mouth to a narrower truncated throat. Suitable positions for mounting the booster to the missile include mounting the booster about the aft portion of the missile or underslung under the missile.

In a preferred embodiment of the invention the retaining means includes forming the receptacle with an opening at its throat and having a forwardly extending boss projecting from the fore end of the tapered member with the boss sized and shaped to fit through the opening in the receptacle. The retaining means further includes a means for engaging the boss to lock the member in the receptacle thus fixing the booster to the missile. In a particularly preferred embodiment, the boss is threaded and the means for engaging the boss comprises a threaded nut.

Further in accordance with this invention there is provided a thrust vector aligned two component delivery system as, for instance, a missile (the first component) and a booster for that missile (the second component). The first delivery component includes a conical receptacle located thereon. This receptacle is aligned in a desired design orientation relative to the center of gravity of the first delivery component. Further, the second delivery component has a known thrust vector and includes a conical member located on its fore end with the conical member aligned in a known relationship with the thrust vector of the second deliver system. Further, there is provided a means for holding the conical member within the conical receptacle to orient the thrust vector of the second delivery component in a desired design orientation relative to the center of gravity of the first delivery component.

In accordance with the objects of the invention the invention further provides a method of connecting a booster to a missile that includes fixedly locating a hollow tapered receptacle on the missile in a position to receive a booster. The method further includes fixedly locating a tapered member on the fore end of the booster. The tapered member is sized and shaped to fit into and couple with the tapered receptacle. The member is positioned in the receptacle with a retaining means operatively connected between the member and the receptacle to hold the member fixed within the receptacle.

BRIEF DESCRIPTION OF THE DRAWINGS

This invention will be better understood when taken in conjunction with this specification and the drawings wherein:

FIG. 2 is an elevational view in partial section similar to FIG. 1 except the booster rocket component has been severed from the missile and the adapter of the invention;

FIG. 3 is an enlarged side elevational view in section of a linear shaped explosive charge utilized to separate the booster rocket from the missile; and FIG. 4 is side elevational view in partial section of an alternate embodiment of the invention.

DETAILED DESCRIPTION OF THE INVENTION

Figure 1:
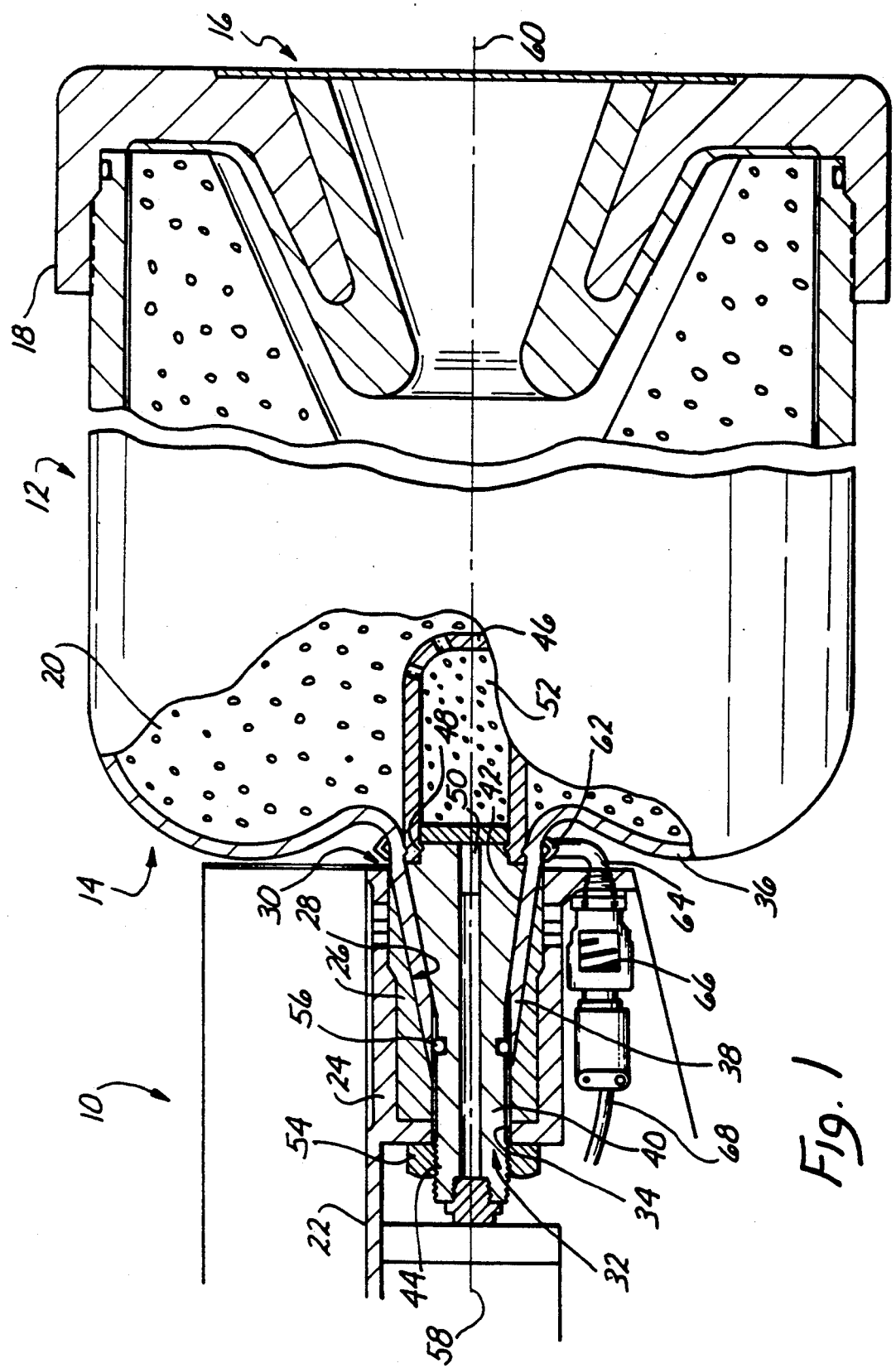
FIG. 1 is an elevational view in partial section of the aft end of a missile, a booster rocket and self-aligning adapter of the invention for connecting the booster rocket to the missile.

In coupling a booster rocket to a missile it is necessary to orient the thrust vector of the booster rocket in a known relationship with the missile as configured in the boost phase. Normally the trust vector of the booster rocket will be oriented towards a location proximally related to the center of gravity of the missile. The exact orientation of the booster thrust vector to the missile depends on many variables. As practiced in the art, the orientation of a booster thrust vector with its missile is computed via various known algorithms that take in to account the various design parameters.

This invention is not directed to calculating the orientation of a booster thrust vector to its missile—this invention is directed to utilizing and maintaining such an orientation after it is determined. Thus, for purposes of description of this invention, once the intercept of the booster thrust vector with its missile has been determined utilizing methods currently practiced by the art skilled, the phrase: the booster thrust vector is in a desired design orientation relative to the center of gravity of the missile, is used to describe the proper alignment or desired intercept of the booster thrust vector with its missile. In such a desired design orientation of the booster thrust vector relative to the center of gravity of the missile, the booster thrust vector is oriented in a known relationship with the center of gravity of the missile. As a practical matter, during launch there will be some deviation from an exact alignment of the booster thrust vector with the desired design orientation relative to the center of gravity of the missile. Deviation occurs because of differences in the center of gravity between missiles having fuel loads therein, fuselage bending variations due to thrust imparted to missiles and nozzle variations between the booster rockets.

Taking into account all sources of deviation of the booster thrust vector from the desired design orientation relative to the center of gravity of the missile, for the purposes of this invention as an additional booster-missile alignment design characteristic, a maximum of about thirty minutes of arc total thrust vector root sum square misalignment error is desirable. As is shown below, an even smaller misalignment error is achieved. It is further desirable that the booster rocket be attachable to the missile utilizing no outside optical adjustment techniques and that it be attachable in a rapid, repeatable and extremely accurate configuration by relatively unskilled personnel under adverse conditions of weather and lighting utilizing only ordinary hand tools. Such conditions, while being very stringent, are achieved with the booster-missile self-aligning adapter of the invention. Further, the booster can be positively ejected from the missile after booster burn out.

Boosters normally may be attached to missiles utilizing one of several orientations. In a first arrangement of the booster and missile, the booster is mounted at the aft end or aft portion of the missile with the thrust vector of the booster in the desired design orientation relative to the center of gravity of the missile. In a further arrangement, the booster is mounted in an underslung position. There are several ways to mount a booster in an underslung position. For underslung boosters, the nozzle of the booster may be oriented along the axis of the booster and in turn the axis of the booster is oriented towards (or in a known relationship with) the center of gravity of the missile. In further underslung boosters, the booster nozzle is canted (with respect to the booster) such that the booster thrust vector is oriented in the desired design orientation relative to the missile center of gravity, even though the thrust vector does not pass along the axis of the booster.

For the purpose of illustrating the booster-missile adapters of the invention, attachment of a booster to the aft end or aft portion of a missile is shown and described in detail. It is recognized that the booster-missile adapters of the invention also can be used to attached a booster to a missile in an underslung booster-missile alignment or other booster-missile alignments.

Shown in FIG. 1 is the aft end of a missile 10. Connected to this missile aft end 10 is a booster rocket 12. The booster rocket 12 is connected at its fore end 14 to the aft end 10 of the missile. The booster rocket 12 includes a rocket nozzle 16 at its aft end 18. Located inside the booster rocket 12 is a charge 20 of propellant.

Within the missile aft end 10 (either at the aft end, or on the lower aft portion of the missile fuselage) is an extension 22 of the missile airframe. A portion of the airframe forms a receptacle 24. A tapered female sleeve 26 fits in the receptacle 24. The sleeve 26 includes a hollow conical surface 28 as its inner surface. The sleeve 26 is press fitted into the receptacle 24 such that together the sleeve 26 and receptacle 24 form a hollow conical receptacle. The receptacle 24 and sleeve 26 have a broad opening generally identified by the numeral 30 at the missile aft end 10 and a narrower throat generally identified by the numeral 32 oriented towards the front of the missile 10. Located within the throat 32 of the receptacle 24 and sleeve 26 is an opening 34. For descriptive purposes, the receptacle 24 can be considered as being a truncated hollow conical receptacle having a open base (the broad opening 30) and the opening 34 can be considered as being located in or through the plane that truncates this conical receptacle. Thus the opening 34 can be described as being formed through the plane of truncation of the truncated conical receptacle.

The casing 36 of the booster 12 is machined about its fore end 14 to include a tapered extension 38. The extension 38 is formed as a conical male extension and is sized and shaped to be positioned within the sleeve 26. The section 38 of the booster 12 mates with the sleeve 26 within the receptacle 24 on the missile 10. Located within the tapered extension 38 is a boss 40. The boss 40 includes a tapered area 42 that fits inside the tapered extension 38 as well as a threaded cylindrical area 44 that projects forward from the tapered extension 38. The diameter of the cylindrical area 44 is sized to fit within the opening 34 in the receptacle 24. An igniter housing 46 mates with the case 36 via a circular crimp joint 48. A squib 50 extends through the boss 40 to the igniter housing 46. The squib 50 is utilized to activate the igniter 52 that in turn ignites the propellant 20 in the booster rocket 12.

A nut 54 threads onto the cylindrical area 44 of the boss 40 and pulls the boss 40 tightly into the receptacle 24. This, in turn, pulls the casing 36 of the booster rocket 12 into the receptacle 24. The single nut 54 secures the booster rocket 12 to the missile 10 and concurrently the fit or interaction of the tapered extension 38 of the booster rocket 12 in the sleeve 26 aligns the booster rocket 12 to the missile 10. An 0-ring 56 seals the boss 40 to the extension 38. The nut 54 serves as a retaining means for fixing the booster rocket 12 to the missile 10. Other equivalent means, such as a clamp or a retaining spring, that also securely hold the boss 40 to the extension 38 also might be utilized as the retaining means.

The tapered extension 38 of the casing 36 of the booster rocket 12 can be considered as a tapered member located on the booster 12. As shown in FIG. 1, the tapered extension 38 is integrally formed as a part of the casing 36 of the booster rocket 12. Alternately the extension 38 could be formed as a separate component that is appropriately press-fit, bolted, welded or otherwise attached to the casing 36.

For the purposes of this invention, a "conical axis" is defined as being the axis extending in a right circular cone from the apex (or the theoretical apex if the cone is truncated) of the cone to the center of the base of the cone. In applying this definition to structures in FIG. 1, the conical axis of the extension 38 of the rocket booster casing 36 is coincident with the conical axis of the sleeve 26.

If the receptacle 24 is positioned with respect to the remainder of the missile 10 such that the conical axis of the sleeve 26 lies in the desired design orientation relative to the center of gravity of the missile 10 (as for instance, directly in line with the center of gravity of the missile), then when the booster rocket 12 is mated with the missile 10, the conical axis of the extension 38 is positioned directly coincident with the conical axis of the sleeve 26. This conical axis is indicated by the line 58 in FIG. 1. Further, if the booster rocket 12 is constructed such that the conical axis of the extension 38 lies directly along the center line of the rocket motor nozzle 16 as indicated by the center line 60, then the conical axis of the extension 38 also is aligned along the center line of the rocket nozzle 16. As so aligned, the thrust vector imparted to the booster rocket 12 would extend along this center line 60 since this is the center line of the rocket nozzle 16. Thus, by utilizing an adapter of the invention that positions the conical axis of the male tapered member of the booster rocket coincident with the conical axis of the female receptacle on the missile 10 the thrust vector of the booster 12 is positioned in the desired design orientation relative to the center of gravity of the missile 10 (as for instance, directly in line with the center of gravity of the missile) when the booster 12 is mated to the missile 10.

Utilizing the booster-missile adapters of the invention, alignment of the thrust vector of the booster rocket 12 with the missile 10 is thus achieved by simply positioning the tapered extension 38 of the booster 12 within the sleeve 26 and securing it there via the nut 54 threading onto the threads of the cylindrical extension 44 of the boss 40. Simply attaching the booster rocket 12 to the missile 10 via the nut 54 achieves self-alignment of the thrust vector of the booster rocket 12 with an axis running through the center of gravity of the missile 10 (or through any other predetermined desired position on the missile).

A linear shaped charge 62 is wrapped around the base of the tapered extension 38 and is fixed in place utilizing an appropriate epoxy bond or the like. The linear shaped charge 62 extends completely circumferentially around the base of the tapered extension 38. A short fuse 64 extends from the linear shaped charge 62 to a squib 66 fixed to the receptacle 24 on the extension of the missile airframe 22. A command wire 68 leads to the squib 66. In response to a current in the command wire 68, the squib 66 ignites the fuse 64 which in turn detonates the linear shaped charge 62. This is shown in FIG. 2.

Upon detonation or explosion of the linear shaped charge 62, the remainder of the casing 36 of the booster rocket 12 is separated from the tapered extension 38. This cleanly severs the booster rocket 12 from the missile 10 allowing the booster rocket 12 to fall away. Since the detonation explosion of the linear shaped charge 62 is symmetrically inward, a clean cut of the tapered extension 38 from the remainder of the casing 36 of the booster rocket 12 is achieved. After the booster release is achieved via the explosion of the linear shaped charge 62, the tapered extension 38 and the nut 54 retaining it to the missile 10 remain in place within the sleeve 26 and the receptacle 24.

FIG. 3 shows an enlarged view of the linear shaped charge 62. The linear shaped charge 62 is composed of a pyrotechnic core 70 that is encased within a sheath 72. Such a linear shaped charge is commercially available from the Ensign-Bickford Company, Simsburg, Conn.

In use the booster rocket 12 would be appropriately mated to the missile 10 by insertion of the tapered extension 38 and its boss 40 into the sleeve 26 of the receptacle 24. The threaded end of the boss 40 is passed through the opening 34 and is secured there with the nut 54. Tightening of the nut 54 to seat the tapered extension 38 of the booster rocket 12 within the sleeve 26 aligns the center line of the rocket nozzle 16 in the desired design orientation relative to the center of gravity of the missile 10. Such alignment can easily be achieved to within ±15 minutes of arc.

To ignite the booster rocket 12, an appropriate electrical signal is sent to the squib 50 which then fires the igniter material 52 in the igniter housing 46. This, in turn, ignites the propellant 20. After burnout of the propellant 20, the squib 66 is fired to detonate the linear shaped charge 62. The explosion of the linear shaped charge 62 severs the spent booster rocket from the missile 10 such that other systems in the missile 10 can be activated as, for instance, a turbojet to impart further momentum to the missile 10.

As is shown in FIG. 2, the half angle α between the tapered extension 38 and a line parallel to the conical axis of the tapered extension 38 can be defined. This angle is normally set to be a shallow angle as, for instance, from about 10° to about 25° with about 20° being the preferred angle. As so angled, the tapered extension of the booster rocket 12 will accurately self-align to the missile 10, and achieve sufficient structural integrity to allow for transmission of launch force as well as transportation and handling loads between the missile 10 and the booster rocket 12. If, for instance, the length of the tapered extension 38 of the booster rocket 12 is about 2 to 3 inches, this angle also allows for easily achieved manufacturing machine tolerances while maintaining the thrust vector of the booster rocket 12 within about ±15 minutes of arc of the desired design orientation relative to the center of gravity of the missile 10.

The rotational alignment of the booster rocket 12 to the missile 10 is not critical since the booster rocket 12 essentially has rotational symmetry. However, if it were desired to align fins on the booster rocket 10 to appropriate control fins on a missile 10, a spline or key (not shown or number in the drawings) could be incorporated along the tapered extension 38 of the booster rocket 12 to mate with an appropriate keyway in the sleeve 26. A spline or key may also be used for aligning an underslung booster having a canted nozzle to a missile. The key or spline would maintain the canted nozzle properly oriented with respect to the missile during assembly of the booster to the missile, handling of the mated booster-missile assembly and launch.

As illustrated in the figures, the receptacle 24 and sleeve 26 are shown as separate components. They could, however, be formed as a single component integral with the extension of the missile airframe 22 by simply machining in a female conical surface in the air frame 22 with the conical axis of that conical receptacle located in the desired design orientation relative to the center of gravity of the missile 10.

Referring now to FIG. 4, a further embodiment of the invention is shown. In this embodiment a female conical receptacle 74 has been machined into an airframe 76 of the missile. A tapered member 78 is formed on the fore end of a booster missile casing 80. Bolts collectively identified by the numeral 82 extend between a flange 84 formed as a part of the receptacle 74 and appropriate drillings in the casing 80. A shaped linear charge 86 is formed into a flat ring-like shape and positioned in a groove 88 just outboard of where the bolts 82 connect to the casing 80. An igniter 90 is positioned in association with the linear charge 86. The igniter 90 is positioned in an extension 92 further projecting from the flange 84. An igniter 94 for the booster propellent (not shown or numbered) is located in the center of the tapered member 78.

Upon expenditure of the booster propellant, the igniter 90 is activated to explode the linear charge 86. This explosion cuts the casing 80 directly in line with the groove 88 to sever that portion of the casing 80 that is radially outward from the groove 88. In the embodiment in FIG. 4, a single central nut corresponding to the nut 54 of the embodiment of FIG. 1 is not used, but in its stead a plurality of bolts 82 are utilized to secure the booster to the missile. However, as per the embodiment of FIG. 1, the positioning of the tapered member 78 within the receptacle 74 self-aligns and positions the booster with respect to the missile.

For the purposes of this invention the booster rocket 12 can be considered to be a rocket powered booster and the missile 10 as a vehicle. Further, for the purposes of this invention, the missile 10 and the booster rocket 12 can be considered to be components of a delivery system for delivering a payload package—the missile 10 being a first delivery component and the booster 12 being a second delivery component. The self-aligning adapter of the invention (comprising the tapered male surface on the booster rocket that fits into the tapered female surface on the missile) allows for aligning the thrust vector of the booster (or second delivery component) in a desired design orientation relative to the center of gravity of the missile (vehicle or first delivery component).

This invention may be embodied in other specific forms without departing from the spirit and essential characteristics thereof. The present embodiments are therefore to be considered in all respects as illustrated and not restrictive, the scope of the invention being indicated by the appended claims rather than by the forgoing description and all changes that come within the meaning and range of equivalencies of the claims are therefore intended to be embraced therein.

We claim:

1. A booster-missile assembly for a missile having a predetermined center of gravity, comprising:
    a missile body including means at one end of said body forming a receptacle having a rearward facing opening in the shape of a truncated circular cone;
    a booster rocket including means forming a nose having the shape of a hollow truncated circular cone for mating with said receptacle;
    said nose including a conical surface tapering from a broad aft end to a narrower truncated fore end; and
    said receptacle having a hollow, conical shape tapering from a broad mouth to a narrower truncated throat,
    said booster rocket further including a propulsive charge constructed and arranged to develop a thrust vector passing through said center of gravity;
    means for mechanically coupling said missile receptacle and said booster rocket nose into a unitary structure;
    explosive means positioned adjacent said nose for explosively disintegrating the adjacent portion of said booster rocket to thereby sever the missile body from the booster rocket adjacent the nose during flight, and
    booster igniter means located in said hollow nose of said booster rocket.

2. A booster-missile assembly of claim 1 wherein:
    the half angle taper of said conical surface is from about 10 degrees to about 25 degrees.

3. A booster-missile assembly of claim 2 wherein:
    said half angle taper of said conical surface is about 20 degrees.

4. The assembly of claim 1 further in which:
    said receptacle has an opening at its throat;

said nose has a forward extending boss projecting therefrom, said boss extending through said opening in said receptacle; and further including retaining means fixedly retaining said boss to said receptacle.

5. The assembly of claim 1 further including:

explosive means including a shaped explosive charge for explosively severing said nose about its broad aft end from said booster.

6. A booster-missile adapter comprising:

a hollow tapered receptacle means for receiving a tapered member, said receptacle means locatable on a missile in a position for receiving a booster;

a tapered member extending into and mating with said tapered receptacle means, said tapered member locatable on a booster;

retaining means for holding said tapered member is said receptacle means; and explosive release means for explosively releasing said tapered member from said booster, said tapered member includes a conical surface tapering from a broad aft end to a narrower truncated fore end; and said hollow tapered receptacle means including a hollow conical shaped receptacle tapering from a broad mouth to a narrower truncated throat, said receptacle having an opening at its throat;

said tapered member having a forward extending boss projecting from the fore end of said member, said boss extending through said opening in said receptacle; and said retaining means fixedly retaining said boss to said receptacle, said boss having a threaded portion thereon; and said retaining means having a nut means for threading onto said threaded portion of said boss.

7. In combination with a missile and a booster for said missile, an adapter for connecting said booster to said missile comprising:

a hollow tapered receptacle located on said missile in a position for receiving a booster;

a tapered member located on said booster, said tapered member extending into said tapered receptacle;

retaining means for holding said tapered member in said tapered receptacle, said tapered member tapering from a broad aft end to a narrower truncated fore end;

said hollow tapered receptacle means tapering from a broad mouth to a narrower truncated throat;

said receptacle having an opening at its throat;

said tapered member having forward extending boss projecting from the fore end of said member, said boss extending through said opening in said receptacle; and said retaining means fixedly retaining said boss to said receptacle, said boss having a threaded portion thereon, and said retaining means comprising a nut for threading onto said threaded portion of said boss.

8. A method of connecting a booster to a missile comprising:

fixedly locating a hollow tapered receptacle on a missile:

fixedly locating a tapered member on a booster, said tapered member constructed and arranged to fit into and couple with said tapered receptacle;

positioning said member in said receptacle;

operatively connecting a retaining means between said receptacle and said member, said retaining means for holding said member fixed within said receptacle;

locating a threaded boss on said tapered member distal from said booster;

locating an opening in said receptacle proximal to said missile;

selecting a nut as said retaining means; and positioning said boss through said opening and securing said member in said receptacle by threading said nut onto said threaded boss.

* * * * *